United States Patent [19]
Haugwitz et al.

[11] 3,852,301
[45] Dec. 3, 1974

[54] ENOL BETAINES OF IMIDAZOLES

[75] Inventors: Rudiger D. Haugwitz, Titusville; Venkatachala L. Narayanan, Hightstown, both of N.J.

[73] Assignee: E. R. Squibb & Sons, Inc., Princeton, N.J.

[22] Filed: June 21, 1973

[21] Appl. No.: 372,356

[52] U.S. Cl.............................. 260/309, 424/273
[51] Int. Cl........................................................ C07d
[58] Field of Search................................... 260/309

[56] References Cited
UNITED STATES PATENTS
3,468,902  9/1969  Beaman et al...................... 260/309

*Primary Examiner*—Henry R. Jiles
*Assistant Examiner*—C. M. S. Jaisle
*Attorney, Agent, or Firm*—Lawrence S. Levinson; Merle J. Smith; Stephen B. Davis

[57] ABSTRACT

Enol betaines of imidazoles and their methods of preparation are disclosed. In addition, pharmaceutical compositions containing said compounds and methods for using said pharmaceutical compositions in the treatment of inflammation are taught.

5 Claims, No Drawings

ENOL BETAINES OF IMIDAZOLES

This invention relates to compounds of the formula:

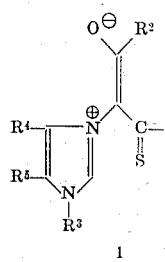

wherein
- $R^1$ is lower alkyl, allyl, aryl or alicyclic,
- $R^2$ is aryl,
- $R^3$ is lower alkyl, aryl or benzyl and
- $R^4$ and $R^5$ are the same or different and may be hydrogen, lower alkyl, aryl, halo or nitro.

The preferred compounds of this invention are those wherein $R^1$ is alicyclic, $R^2$ is phenyl, $R^3$ is lower alkyl, and $R^4$ and $R^5$ are hydrogen, and the most preferred being those wherein $R^1$ is cyclohexyl, $R^2$ is p-chlorophenyl, $R^3$ is methyl and $R^4$ and $R^5$ are hydrogen.

In addition, this invention encompasses the methods for preparing said compounds, pharmaceutical compositions containing said compounds and methods for using said compositions as antiinflammatory agents.

In this invention, the term "aryl" is intended to include phenyl, naphthyl, substituted phenyl wherein said substituent may be fluoro, chloro, bromo, iodo, nitro, trifluoromethyl, lower alkyl and lower alkoxy.

The term "lower alkyl" is intended to mean a straight or branched hydrocarbon fragment of from one to eight carbon atoms.

The term "lower alkoxy" is intended to mean a lower alkyl group linked through a single bond to oxygen.

The term "alicyclic" is intended to include saturated hydrocarbon ring systems of from three to eight carbon atoms, such as cyclopropyl, cyclohexyl, etc.

The term "halo or halogen" is intended to include chlorine, bromine, iodine and fluorine.

The compounds of this invention (I) are prepared by first synthesizing quaternary salts of structure 4 by reacting imidazoles of the formula 2 with haloketones of the formula 3 wherein $R^2$ to $R^5$ are as previously defined and X is chloro, bromo or iodo.

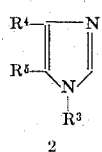 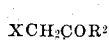 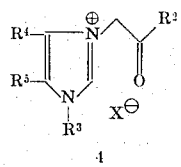

This reaction is carried out according to the procedure for the preparation of 1-methyl-3-phenacylimidazolium bromide described in J.A.C.S., 90, (14) 3830 (1968) which is incorporated by reference.

Compound 4 on exposure to base gives the ylid 5

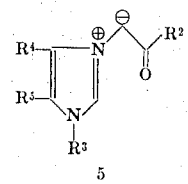

Thus, the preparation of the ylid, 5, can be undertaken by dissolving the salt 4 in water, basifying the solution with potassium carbonate and extracting the product with $CHCl_3$ as described in Chem. Pharm. Bull., 18 (12) 2489 (1970) which is incorporated by reference, or, by basifying a dimethyl formamide solution of 4 with $K_2CO_3$ and utilizing the solution of 5 for the next transformation J.A.C.S., 90, (14) 3830 (1968) which is also incorporated by reference.

Treatment of 5 with an isothiocyanate of the formula $R^1NCS$ wherein $R^1$ is as previously defined gives the compounds of structure 1. It should be evident that additional tautomeric structures of 1 can be written, such as 1a and 1b, and this invention is intended to encompass all of the possible tautomers.

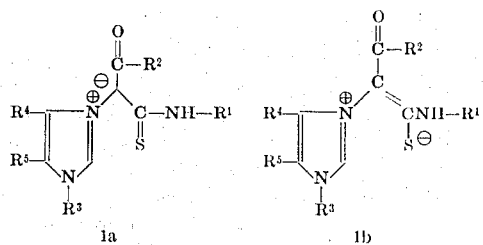

The conversion of compounds of the formula 5 into the compounds of formula 1 is brought about in aprotic solvents such as DMF, DMSO, acetonitrile, etc., at ambient to elevated temperatures of about 100° for periods of about 30 minutes to 24 hours.

The compounds of this invention have thus been found to be useful as antiinflammatory agents in mammals when administered in amounts ranging from about 1.2 mg. to about 30 mg. per kg. of body weight per day. A preferred dosage regimen for optimum results would be from about 1.5 mg. to about 15 mg. per kg. of body weight per day, and such dosage units are employed that a total of from about 100 mg. to about 2 g. of active ingredient for a subject of about 70 kg. body weight are administered in a 24 hour period.

The compounds of the present invention in the described dosages are intended to be administered orally; however, other routes such as rectally, intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1 percent of active compound. The percentage in the compositions and preparations may, of course, be varied and may conveniently be between about 5 percent to about 75 percent or more of the weight of the unit. The amount of active compound in such therapeutically useful compositions or preparations is such that a suitable dosage will be obtained. Preferred compositions or preparations according to the present invention are prepared so that an oral dosage unit form contains between about 10 and 200 milligrams of active compound.

The tablets, troches, pills, capsules and the like may also contain the following: a binder such as gum tragacanth, acacia, corn starch or gelatin; an excipient such as dicalcium phosphate, a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The invention will be described in greater detail in conjunction with the following specific examples.

DETAILED DESCRIPTION

The following examples are provided for illustrative purposes and may include particular features of the invention; however, the examples should not be construed as limiting the invention, many variations of which are possible without departing from the spirit or scope thereof.

EXAMPLE 1

1-Methylimidazolium-(p-chlorobenzoyl)(phenylthiocarbamoyl)-methylide.

a. To 8.2 g of 1-methylimidazole dissolved in 300 ml of ether there is added 24 g of α-bromo-p-chloroacetophenone. After 4 days of standing the solid is filtered off and crystallized from methanol-acetone-ether to furnish the quaternary salt.

b. A suspension of 4 g of the above salt, and 4 g of $K_2CO_3$ in 20 ml of DMF is stirred for 30 minutes at room temperature. Then, there is added at once 4 ml of phenyl isothiocyanate and the mixture is stirred overnight. Water is added and the resulting solid is filtered off. Two crystallizations from acetone yielded 2.8 g of the pure product, mp 205°–206°.

Anal. Calcd for $C_{19}H_{16}ClN_3OS$: C,61.70; H,4.36; N,11.36
Found: C,61.33; H,4.57; N,11.15

EXAMPLE 2

1-Methylimidazolium benzoyl-(phenylthiocarbamoyl)-methylide.

a. To 8.2 g of 1-methylimidazole dissolved in 200 ml of ether, there is added with cooling 20 g of α-bromoacetophenone. The mixture is allowed to stand for 4 days at room temperature. The precipitated crystals are filtered and crystallized from methanol-acetone-ether to yield the quaternary salt.

b. A suspension of 4 g of the above salt, and 4 g of $K_2CO_3$ in 28 ml of DMF is stirred at room temperature for 30 minutes. To the mixture there is added 4 ml of phenyl isothiocyanate and the suspension is stirred overnight. Water is added and the formed solid filtered off and crystallized from acetone to yield 3.5 g, mp 205°–206°.

Anal. Calcd for $C_{19}H_{17}N_3OS$: C,68.03; H,5.11; N,12.53
Found: C,68.12; H,5.34; N,12.69

EXAMPLE 3

1-Methylimidazolium(p-chlorobenzoyl)(cyclohexylthiocarbamoyl)-methylide.

A mixture of 4 g of the salt of Example 2a, 4 g of $K_2CO_3$ and 28 ml of DMF is stirred at room temperature for 30 minutes. To the suspension there is added at once 4 ml of cyclohexyl isothiocyanate and the stirring is continued over night. Water is added, the solid is filtered off and crystallized twice to yield 3 g, mp 230°–232°.

Anal. Calcd for $C_{19}H_{22}ClN_3OS$: C,60.70; H,5.90; N,11.18
Found: C,60.90; H,6.09; N,11.29

EXAMPLES 4-10

According to the procedure of Example 1 part a, upon substituting in place of α-bromo-p-chloroacetophenone one of the following ketones
α-bromo-2′, 5′-dimethoxyacetophenone,
α-bromo-o-methoxyacetophenone,
α-chloro-p-phenylacetophenone,
α-chloro-m-bromoacetophenone,
α-bromo-p-ethylacetophenone,
α-chloro-p-fluoroacetophenone,
α-bromo-p-nitroacetophenone,
and substituting 1-benzylimidazole for 1-methylimidazole and reacting the resulting quaternary salt with the following isothiocyanates:
allyl isothiocyanate
4-fluorophenyl isothiocyanate
methyl isothiocyanate
2-chlorophenyl isothiocyanate
benzyl isothiocyanate
2,4-dimethylphenyl isothiocyanate
4-ethoxyphenyl isothiocyanate
one obtains the following enol betaines:
1-benzylimidazolium(2,5-dimethoxybenzoyl)(allylthiocarbamoyl)methylide, 1-benzylimidazolium(o-methoxybenzoyl)(4-fluorophenylthiocarbamoyl)methylide,
1-benzylimidazolium(p-phenylbenzoyl)(methylthiocarbamoyl) methylide,
1-benzylimidazolium(m-bromobenzoyl)(2-chlorophenylthiocarbamoyl)methylide,
1-benzylimidazolium(p-ethylbenzoyl)(benzylthiocarbamoyl)methylide,
1-benzylimidazolium(p-fluorobenzoyl)(2,4-dimethylphenyl thiocarbamoyl)methylide,
1-benzylimidazolium(p-nitrobenzoyl)(4-ethoxylphenylthiocarbamoyl)methylide.

Example 11

Preparation of Oral Syrup Formulatin

| Ingredient | Amount |
| --- | --- |
| 1-Methylimidazolium-(p-chlorobenzoyl)-(phenylthiocarbamoyl)methylide | 1000 mg. |
| Sorbitol Solution (70% N.F.) | 40 ml. |
| Sodium benzoate | 150 mg. |
| Saccharin | 15 mg. |
| Red dye (F.D. & C. No. 2) | 10 mg. |
| Cherry flavor | 50 mg. |
| Distilled water, q.s. ad | 100 ml. |

The sorbitol solution is added to 40 ml. of distilled water and the active ingredient is suspended therein. The saccharin, sodium benzoate, flavor and dye are added and dissolved in the above solution. The volume is adjusted to 100 ml. with distilled water.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

What is claimed is:

1. A compound of the formula

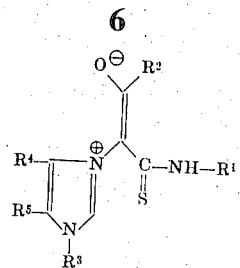

wherein $R^1$ is selected from the group consisting of lower alkyl, allyl, benzyl, cyclohexyl, phenyl and phenyl substituted by fluoro, chloro, lower alkyl or lower alkoxy; $R^2$ is selected from the group consisting of phenyl and phenyl substituted by chloro, lower alkyl, lower alkoxy, phenyl, bromo, fluoro or nitro; $R^3$ is selected from the group consisting of lower alkyl and benzyl; and $R^4$ and $R^5$ are both hydrogen.

2. The compounds of claim 1 wherein $R^1$ is cyclohexyl, $R^2$ is p-chlorophenyl and $R^3$ is methyl.

3. A process for preparing the compounds of claim 1 which comprises reacting a compound of the formula $$R^1NCS$$

with a compound of the formula

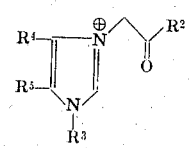

in an aprotic solvent.

4. A compound of claim 1 wherein $R^1$ is phenyl; $R^2$ is p-chlorophenyl; and $R^3$ is methyl.

5. A compound of claim 1 wherein $R^1$ and $R^2$ are both phenyl and $R^3$ is methyl.

* * * * *